United States Patent
Wendel et al.

(10) Patent No.: US 9,826,252 B2
(45) Date of Patent: Nov. 21, 2017

(54) METHOD AND VIDEO SYSTEM FOR FREEZE-FRAME DETECTION

(71) Applicants: Dirk Wendel, Grasbrunn (DE); Joachim Fader, Munich (DE); Stephan Herrmann, Markt Schwaben (DE); Wilhard Christophorus Von Wendorff, Munich (DE)

(72) Inventors: Dirk Wendel, Grasbrunn (DE); Joachim Fader, Munich (DE); Stephan Herrmann, Markt Schwaben (DE); Wilhard Christophorus Von Wendorff, Munich (DE)

(73) Assignee: NXP USA, Inc., Austin, TX (US)

(*) Notice: Subject to any disclaimer, the term of this patent is extended or adjusted under 35 U.S.C. 154(b) by 264 days.

(21) Appl. No.: 14/445,718

(22) Filed: Jul. 29, 2014

(65) Prior Publication Data
US 2016/0037186 A1    Feb. 4, 2016

(51) Int. Cl.
*H04N 19/89*    (2014.01)

(52) U.S. Cl.
CPC .................. *H04N 19/89* (2014.11)

(58) Field of Classification Search
CPC ......... H04N 19/89; H04N 19/46; H04N 19/66
See application file for complete search history.

(56) References Cited

U.S. PATENT DOCUMENTS 6,201,834 B1    3/2001    Zhu
6,377,297 B1 *  4/2002    Janko .................. H04N 19/85
                                                    348/180
6,564,000 B2    5/2003    Shimura
(Continued)

FOREIGN PATENT DOCUMENTS

| JP | 2002290998 A | 10/2002 |
|---|---|---|
| JP | 2004242223 A | 8/2004 |
| JP | 2009130436 A | 6/2009 |

OTHER PUBLICATIONS

Microsoft, "Timeout Detection and Recovery (TDR)," downloaded from <<http://msdn.microsoft.com/en-us/library/windows/hardware/ff570087(v=vs.85).aspx>> on Jun. 14, 2014; 1 page.

(Continued)

*Primary Examiner* — William C Vaughn, Jr.
*Assistant Examiner* — Joseph A Towe (57) ABSTRACT

A method for detecting a freeze-frame condition comprises receiving a sequence of images from at least one digital device; selectively encoding a first subset of the sequence of images using a first coding scheme that causes an adjustment to an image characteristic of the selected images being encoded; selectively encoding a second subset of the sequence of images using a second coding scheme; storing the first encoded subset and second encoded subset; retrieving the stored first encoded subset and second encoded subset; selectively decoding the first subset of the selected images using the first coding scheme and selectively decoding the second subset of the selected images using the second coding scheme to re-create the sequence of images. A freeze-frame condition in the re-created sequence of images is identifiable based on a plurality of decoded images being different with respect to the image characteristic across multiple decoded image frames.

18 Claims, 8 Drawing Sheets

(56) References Cited

U.S. PATENT DOCUMENTS

| | | | |
|---|---|---|---|
| 6,633,329 | B2 | 10/2003 | Janko et al. |
| 7,929,796 | B2 | 4/2011 | Funayama |
| 8,249,363 | B2 | 8/2012 | Lee et al. |
| 2001/0034866 | A1 | 10/2001 | Barry |
| 2004/0143710 | A1 | 7/2004 | Walmsley |
| 2004/0194001 | A1 | 9/2004 | Ting et al. |
| 2005/0125733 | A1 | 6/2005 | Aleksic |
| 2006/0026363 | A1 | 2/2006 | Yamazaki |
| 2006/0120390 | A1 | 6/2006 | Habben |
| 2006/0234202 | A1 | 10/2006 | Brown |
| 2006/0251115 | A1 | 11/2006 | Haque |
| 2007/0030933 | A1* | 2/2007 | Galluscio .............. H04L 1/0006 375/354 |
| 2007/0040033 | A1 | 2/2007 | Rosenberg |
| 2007/0046679 | A1* | 3/2007 | Tanaka .................... G06T 1/00 345/501 |
| 2008/0005649 | A1 | 1/2008 | Feeney et al. |
| 2008/0052569 | A1 | 2/2008 | Ngo |
| 2008/0086749 | A1 | 4/2008 | Goldberg et al. |
| 2008/0126882 | A1 | 5/2008 | Fulton |
| 2008/0310516 | A1 | 12/2008 | Kobayashi et al. |
| 2009/0028238 | A1 | 1/2009 | Collomosse et al. |
| 2009/0041115 | A1 | 2/2009 | Ramesh et al. |
| 2009/0147861 | A1* | 6/2009 | Schnebly ............. G06T 1/0085 375/240.27 |
| 2009/0181628 | A1 | 7/2009 | Feder et al. |
| 2009/0268816 | A1 | 10/2009 | Pandit |
| 2010/0225767 | A1* | 9/2010 | Ferguson ............. H04N 17/004 348/180 |
| 2013/0100152 | A1 | 4/2013 | Feng et al. |
| 2013/0128022 | A1 | 5/2013 | Bose |
| 2014/0192866 | A1* | 7/2014 | Cohen .................. H04N 19/176 375/240.12 |
| 2014/0198838 | A1* | 7/2014 | Andrysco ............ H04N 19/172 375/240.1 |
| 2014/0294126 | A1* | 10/2014 | Rege ................... H04L 25/4975 375/341 |
| 2014/0321640 | A1 | 10/2014 | Johne |

OTHER PUBLICATIONS

Tektronix; "Black and Frozen Frame Detection," How to Guide; WFM6120/7020/7120 & WVR6020/7020/7120; Version 5.0.2 Software; downloaded from <<www.tek.com/dl/2PW-24654-0.pdf>> on Jun. 14, 2014; 12 pages.

U.S. Appl. No. 14/224,167, filed Mar. 25, 2014, entitled "Circuit Arrangement and Method for Processing a Digital Video Stream and for Detecting a Fault in a Digital Video Stream, Digital Video System and Computer Readable Program Product".

Chauhan et al., "Hybrid Approach for Video Compression Based on Scene Change Detection," IEEE, 2013, 5 pages.

Thaipanich et al., "Low Complexity Algorithm for Robust Video Frame Rate Up-Conversion (FRUC) Technique," IEEE Transactions on Consumer Electronics, vol. 55, No. 1, Feb. 2009, 9 pages.

* cited by examiner

METHOD AND VIDEO SYSTEM FOR FREEZE-FRAME DETECTION

FIELD OF THE INVENTION

The field of this invention relates to a method and video system for freeze-frame detection, and in particular to performing an encoding and/or decoding sequence on a sequence of image frames in order to highlight a freeze-frame condition.

BACKGROUND OF THE INVENTION

Digital video systems generally communicate a sequence of digital images from a source, such as a camera, to a destination, such as a display.

Various system failures within the digital video system may cause a sequence of images to stop or to lock-up, resulting in a 'freeze-frame' condition. Such failures may comprise camera lock-ups, electronic lock-ups, communication faults, storage failures, repeated frames, skipped frames or partial frames, etc.

In critical applications, it is important for a video system operator or user to know quickly if a video system has failed. This may be the case where a static image on the operator's display may cause the operator to erroneously conclude that the scene at the source is simply not changing, when in fact the video system is not functioning correctly. These critical applications could comprise security monitoring, medical monitoring, military surveillance, navigation, manufacturing system tracking, etc.

Figure 1:
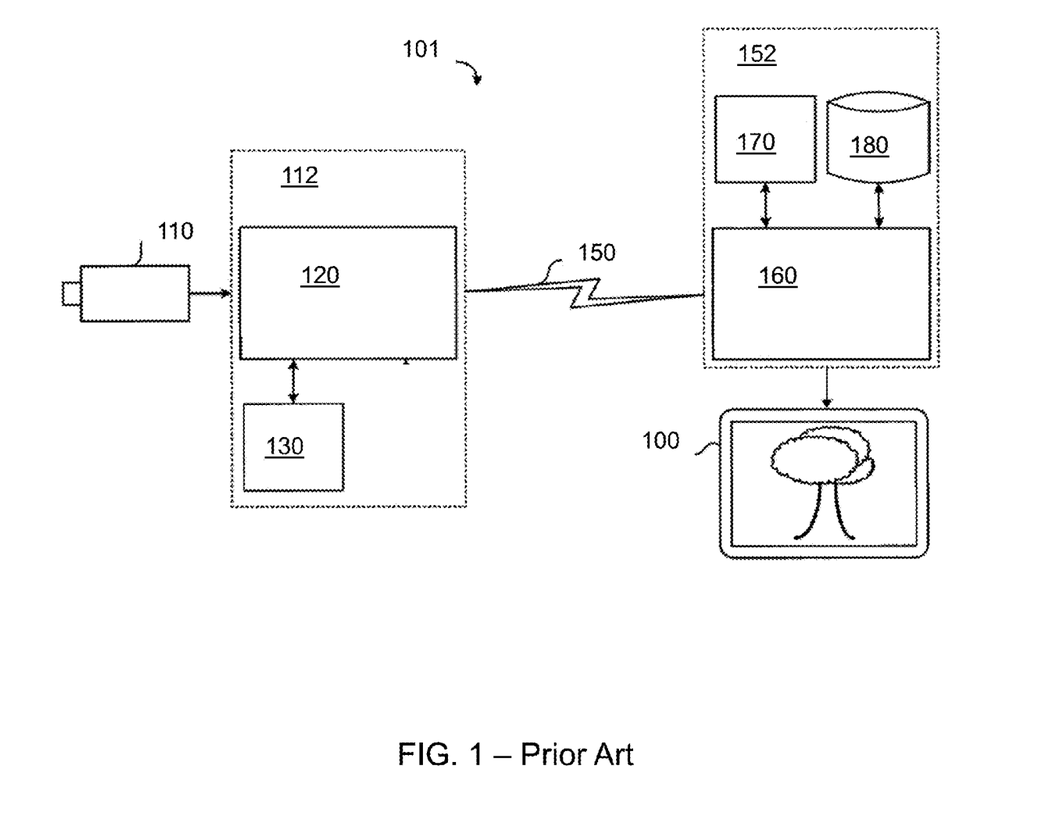
FIG. 1 illustrates a known functional block diagram of a freeze-frame detection system.

Referring to FIG. 1, a known functional block diagram illustrating a freeze-frame detection system 101 is shown, comprising a camera 110, image encoding system 112, image verification system 152, and a video display 100. The camera 110 is capable of capturing and transmitting video data that includes sequential video frames. The image encoding system 112 includes a source processor 120, memory 130.

The source processor 120 executes coded instructions to encode pixels from the camera 110 with frame detection codes. The video frames containing the encoded pixels can be communicated over a communication link 150 to a display processor 160.

The image verification system 152 receives the encoded video from the image encoding system 112 and utilises the embedded codes to verify video image continuity and detect a freeze-frame when it occurs. The image verification system 152 comprises a display processor 160, as well as memory 170 and storage 180.

The display processor 160 executes coded instructions to extract and verify freeze-frame detection codes from the video frames received via the communication link 150. The verification process includes generating a local version of the next expected code and comparing it with the code extracted from the received video frame. When the freeze-frame detection code extracted from a frame matches the expected code, then the video frame is deemed not frozen and the frame is presented on the video display 100. Otherwise, when the codes do not match, a fault indication may be presented to the operator or user using the video display 100, e.g. a lamp, LED, siren, buzzer, or other indicator of system fault.

For automotive applications, a frozen image can be dangerous if a driver relies on a display showing an image, but the display does not show the actual situation outside of the automotive application or vehicle. If the display simply displays a frozen image, a user of the display may not recognise a problem with the displayed image until it is too late, and an accident may result.

SUMMARY OF THE INVENTION

The present invention provides a method for detecting a freeze-frame condition and a video system therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In some examples, a method for detecting a freeze-frame condition is described. The method comprises receiving a sequence of images from at least one digital device; selectively encoding a first subset of the sequence of images, a portion of an image frame from a plurality of the sequence of images, wherein encoding uses a first coding scheme that causes an adjustment to an image characteristic of the selected images of the image frame being encoded; selectively encoding a second subset of the sequence of images using a second coding scheme; storing the first encoded subset and second encoded subset; retrieving the stored first encoded subset and second encoded subset; selectively decoding the first subset of the selected images using the first coding scheme and selectively decoding the second subset of the selected images using the second coding scheme to re-create the sequence of images; and detecting an existence of a freeze-frame condition in the re-created sequence of images based on a plurality of decoded images being different with respect to the image characteristic across multiple decoded image frames.

In the herein described examples, references to a coding scheme are to be understood as encompassing a set of rules that maps the elements of one set onto the elements of another set, e.g. a non-coded set to a coded set, or a coded set back to an non-coded set. The term coding scheme therefore encompasses both the encoding part of the rules, as well as the decoding part of the rules, which in many (but not necessarily all) examples forms the reverse of the encoding part.

In some examples, a video system for detecting a freeze-frame condition is described. The video system comprises at least one input port for receiving a sequence of images from at least one digital device; at least one encoder arranged to selectively encode a first subset of the sequence of images, wherein the encoder is arranged to use a first coding scheme that causes an adjustment to an image characteristic of the selected images being encoded, and selectively encode a second subset of the sequence of images using a second coding scheme; a memory arranged to store the first encoded subset and second encoded subset; at least one decoder arranged to retrieve the stored first encoded subset and second encoded subset and selectively decode the first subset of the selected images using the first coding scheme and selectively decode the second subset of the selected images using the second coding scheme to re-create the sequence of images; and an output port for outputting decoded images, whereby a freeze-frame condition in the re-created sequence of images is identified based on a plurality of decoded images being different with respect to the image characteristic across multiple decoded image frames.

Examples of the invention are described with respect to employing a first coding scheme for encoding or decoding a first subset of a sequence of images, and employing a second coding scheme for encoding or decoding a second subset of the sequence of images. In some examples, the second coding scheme for encoding or decoding a second subset of the sequence of images may encompass not coding the second subset of the sequence of images at all. Hereafter, examples of the second coding scheme are described with reference to not coding the second subset of the sequence of images at all, although in other examples a skilled artisan will appreciate that a second (actual) coding scheme may be employed in encoding and/or decoding the second subset of the selected images.

In some examples, the second subset of the sequence of images may comprise a remaining set of images from a whole sequence of images that are not the first encoded subset or first decoded subset.

In some examples, detecting a freeze-frame may comprise detecting a portion of a frame that is frozen or a sequence of multiple frames that are frozen. In some examples, the video system and method therefor may be applied to static images (such as a video of art in an art gallery) or semi-static images (such as a slow moving vehicle that is using a video camera to assist reversing).

In the context of examples of the present invention, the concept of memory and buffer storage may be used interchangeably, and encompasses a memory element that comprises buffer logic.

Figure 2:
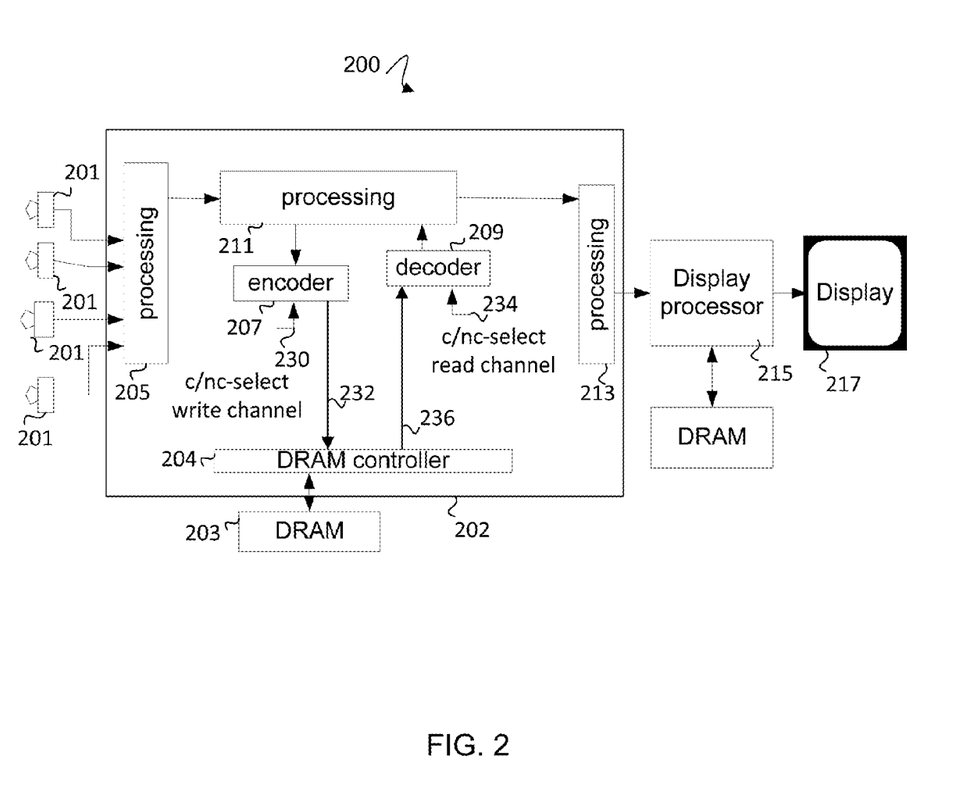
FIG. 2 illustrates a block diagram of an example of a digital imaging system.

Referring to FIG. 2, an example of a digital imaging system 200 is illustrated, according to some examples of the invention.

In this example, digital imaging system 200 may comprise, a number of digital devices 201, a microcontroller (MCU 202) comprising digital processing circuits 205, 211, 213 and a memory controller 204, for example a DRAM controller, image memory 203, for example in a form of dynamic random access memory (DRAM) or any other kind of storage (e.g. a hard disk), a display processor 215 and a display 217. Additionally, the digital imaging system 200 may further comprise at least one encoder circuit 207 and at least one decoder circuit 209.

In some examples, the number of digital devices 201 may be digital cameras, which may be operable to 'capture' digital image information and video information.

In some examples, the number of digital devices 201 may comprise one or more charge coupled devices (CCD) or complementary metal oxide semiconductor (CMOS) sensors.

In some examples, the display 217 may be any display that is capable of displaying digital images or image frames, for example in the form of video, which may be for example one or more of; a liquid crystal display (LCD), a plasma panel, a light emitting diode display (LED) or any other type of static or volatile flat panel display.

One or more outputs from the number of digital devices 201, which in some examples may also comprise an in-built encoding circuit, may be transmitted to one or more input ports of processing circuit 205, wherein the processing circuit 205 may be operable to separate images/frames prior to routing the separated images/frames to further processing circuit 211. The processing circuit 211 utilises one or more image memories, e.g. image memory 203, in order to store captured images from the number of digital devices 201.

Various system failures can occur within digital imaging system 200 that may cause the sequence of written and read images from image memory 203 to be stopped. For example, the write channel 232 may show a fault, or the channel between the digital devices 201 and the image memory 203 may be corrupt or noisy. This may have an effect of causing stored images in the image memory 203 to not be regularly updated and, therefore, old image content may be read by read channel 236 and displayed via display 217. This may result in a freeze-frame being displayed to a user of the digital imaging system 200.

In order to alleviate one or more potential problems discussed above, the digital imaging system 200 may be implemented with encoder circuit 207 and decoder circuit 209. In this example, only one encoder circuit 207 and decoder circuit 209 have been illustrated. However, this is simply for explanatory purposes, and if the digital imaging system 200 requires additional processing steps, for example further read and write operations to an imaging memory, for example image memory 203, further encoder circuits 207 and decoder circuits 209 may be implemented.

In this example, encoder circuit 207 may comprise a coding selection input 230 and a write channel 232. In some examples, the coding selection input 230 may be operably coupled to software, which may be able to operate the encoder circuit 207 to code, 'C', or not code, 'NC', data from processing circuit 211. Depending on the coding selection input 230 determined by software or hardware, the encoder circuit 207 may output a 'coded' or 'not coded' output via write channel 232 to image memory 203, via for example the controller 204. Further, in some other examples, a 'not coded' image may also comprise a form of second coding, wherein the second coding may not be the same as for the 'coded' images.

Further, in this example, decoder circuit 209 may comprise a coding selection input 234 and a read channel 236. In some examples, as with the encoder circuit 207, the decoder circuit 209 may be controlled via software or hardware to either 'code' or 'not code' data received from image memory 203, which may subsequently be outputted to processing circuit 211.

In some examples, utilising hardware such as encoder circuit 207 and decoder circuit 209, in some examples with software control, it is possible to allow a user to recognise a freeze-frame within a sequence of images.

Further, in some examples, utilising hardware such as encoder circuit 207 and decoder circuit 209 may allow a user to recognise a freeze-frame within a static or semi-static image, for example security images within an art gallery.

In some examples, an image received from one or more of the digital devices 201 may be encoded by encoder circuit 207 in a particular manner that causes a noticeable adjustment to a characteristic of the image (or a portion of the image) being encoded. Thus, an error such as a freeze-frame condition may be detected by a visual notification of a change in the decoded and displayed image data or in image data that was automatically processed by, say, at least one of: software, hardware, firmware, in order to determine changes in an image characteristic between successive decoded image frames, thereby avoiding a possibility of human error.

In some examples, a subset of the sequence of images are selectively encoded uses a coding scheme that causes an adjustment to an image characteristic, that is a characteristic that exhibits a discernible and noticeable change to the viewed (or viewable image), rather than a pure manipulation of the image data as part of the encoding (or decoding) process.

In one example, the encoder circuit may cause a noticeable adjustment to a characteristic of the image by inverting a range (or all) pixel values, for example black pixels become white and white pixels become black. Thus, in the context of the present invention, the adjustment to a characteristic of the image comprises not only a manipulation or adjustment of the image data in general, but a significant change to the image data to cause a readily noticeable change to the visual aspect of the image itself.

In one example, the encoder circuit may cause a noticeable adjustment to a characteristic of the image (or a portion of the image) by exchanging colours, for example Cr becomes Cb and Cb becomes Cr. YCbCr, or Y Pb/Cb Pr/Cr is a family of colour spaces used as a part of a colour image pipeline, typically in video and digital photography systems. YCbCr is a practical approximation to colour processing and perceptual uniformity, where the primary colours corresponding roughly to red, green and blue are processed into perceptually meaningful information. By doing this, subsequent image/video processing, transmission and storage can perform operations and introduce errors in perceptually meaningful ways. One practical example may be to decrease the bandwidth or resolution allocated to 'colour' compared to 'black and white', since humans are more sensitive to the black-and-white information.

Thus, in some examples, a useful coding/decoding scheme is provided, that in some instances is lossless (or nearly lossless) in order to not degrade the picture, has a timing aspect aligned to the number of stored images in the buffers, and it disturbs the image sufficiently well enough to indicate that something is erroneous (usually to the vehicle driver, but also supporting a possible detection by hardware).

In one example, the encoder circuit may cause a noticeable adjustment to a characteristic of the image (or a portion of the image) by introducing a timing aspect, wherein the timing aspect may be aligned to a number of stored images in image memory 203, for example. In this manner, the encoder circuit may cause a noticeable adjustment to a characteristic of the image (or a portion of the image) by varying address locations of image data, e.g. macroblocks of image data. Therefore, introducing a timing aspect may disturb the image, or a portion of the image, well enough to indicate that there may be an issue with the digital imaging system 200, which may be detected by a user or by hardware or by software running on hardware.

Alternatively, or additionally, in one example, the encoder circuit may cause a noticeable adjustment to a characteristic of the image (or a portion of the image) by utilising different address of a buffer start for each frame, or utilising more bits to store and change bit positions. In this manner, utilising a varying address of macroblocks or a different address of a buffer-start for each frame may have an advantage of allowing some aspects of the invention to be implemented entirely in software, thereby requiring simple changes (or no changes) to be implemented in hardware.

In some examples, the encoding operation may be performed prior to or during a write operation. In some examples, the performing of the encoding operation prior to or during a write operation may be made inside the camera (e.g. before sending the image(s) to an MCU that then writes the image(s) into memory). In some examples, the encoded image is then forwarded to image memory 203. The encoded image may be subsequently decoded by decoder circuit 209, after or during a read operation, and sent to display 217 via an output port that outputs decoded images. In some examples, if there is a plurality of read and write circuits utilised within digital imaging system 200, it may only be necessary to utilise the above mentioned software control of one encoder circuit 207 and one decoder circuit 209.

In some examples, any type or form of encoding and decoding operation may be utilised, which may ideally utilise a lossless, or nearly lossless, form of encoding/decoding. In some further examples, the encoder circuit 207 and decoder circuit 209 may automatically select to 'code' or 'not code' an image without requiring software control.

However, in some other examples, a decision to 'code' or 'not code' may be determined by software, wherein the software may utilise coding selection inputs 230, 234, in order to trigger the encoder circuit 207 and decoder circuit 209, via a parameter once per frame, for example.

Further, when storing images in memory, for example DRAM, the data may be generally byte aligned, meaning that each byte in memory contains 8-bits of information of, for example, luminance.

In some other examples, a more accurate representation of 12 bits may be used for luminance, utilising two bytes in memory. Therefore, only twelve out of sixteen bits are used, and four bits are wasted. Therefore, in some examples, the utilised twelve bits may be allocated to different bit positions of the available 16 bits. For example, a non-coded signal may be represented as bbbbbbbbbbbb0000, and a coded signal may be represented as 1111bbbbbbbbbbbb, wherein 'b' is a utilised bit. Therefore, if a coded signal is decoded, nc, a result may be 1111bbbbbbbb, and if a non-coded signal is decoded, c, a result may be bbbbbbbb0000. In both these examples, allocating utilised bits to different bit positions may heavily distort a resultant outputted image.

In some examples, the encoder circuit 207 and decoder circuit 209 may comprise an array of logic/flip-flops that are operable to modify one or more received signals from, for example, processor 211 and/or image memory 203. Further, the encoder circuit 207 and decoder circuit 209 may receive one or more software parameters to control the encoder circuit 207 and decoder circuit 209.

Thus, examples of the invention do not require additional data being added to the image data, e.g. provision of additional security, error correction or error detection, and relate solely to manipulating the image data itself, e.g. pixels related to a characteristic of an image (across multiple image frames).

Figure 3:
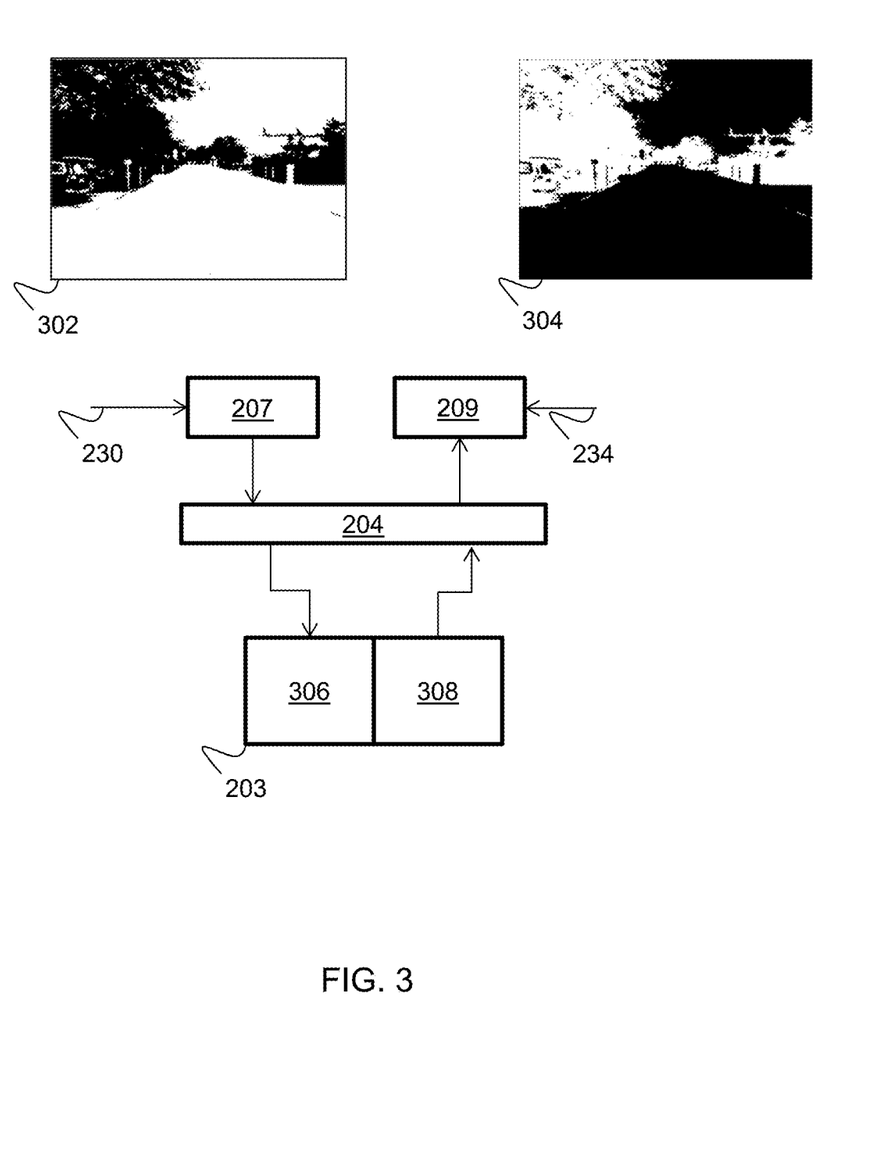
FIG. 3 illustrates an expanded example of the encoder/decoder of the digital imaging system from FIG. 2.

Referring to FIG. 3, an expanded example of the encoder/decoder from FIG. 3 is illustrated, comprising encoder circuit 207, decoder circuit 209, image memory 203 and DRAM controller 204 have also been illustrated, wherein, in this example, the image memory 203 comprises a first buffer 306 and a second buffer 308.

In one example, the coding scheme may be known apriori by an encoder performing the selectively encoding and a decoder performing the selectively decoding. In some examples, selectively encoding and selectively decoding uses the coding scheme to select individual frames of the sequence of image frames to either code/decode or not code/decode In this example, a pixel inversion coding scheme has been selected in order to describe example aspects of the invention. A pixel inversion coding scheme is simply one of many coding schemes that is considered for the concepts herein described.

In this example, an original image 302, which may have been provided by one or more digital devices 201, is illustrated in a black and white format. In this example, the original image 302 may also be the same as a 'not coded' image. Further, in some other examples, a 'not coded' image may also comprise a form of second coding, wherein the second coding may not be the same as for the 'coded' images.

In this example, the encoder circuit of FIG. 2 may cause a noticeable adjustment to a characteristic of the image (or a portion of the image) by inverting a range (or in this case all) pixel values, for example black pixels become white and white pixels become black. Thus, a 'coded' image 304 is also illustrated, which may have been manipulated by one or more encoding circuits.

In this example, the 'coded' image 304 is a pixel inverted image of the 'not coded' image 302. The pixel inversion scheme has been shown for illustrative purposes only, whereas in other examples, a similar procedure could be carried out on a colour image, wherein a 'not coded' image would be a colour image, and a 'coded' image may be a colour adjusted image, which may appear as a negative image of the original.

Referring again to FIG. 3, the representation of part of FIG. 2, comprising encoder circuit 207, decoder circuit 209, image memory 203 and DRAM controller 204 have also been illustrated, wherein, in this example, the image memory 203 comprises a first buffer 306 and a second buffer 308. In this example, the first buffer 306 may be operable to receive images from encoder circuit 207, and the second buffer 308 may be operable to provide images to decoder circuit 209, via DRAM controller 204. In this example, the first buffer 306 and second buffer 308 may form a 'flip-buffer'. Therefore, when the first buffer 306 receives a write operation, the second buffer 308 is read, and subsequently, when the second buffer 308 receives a write operation, the first buffer 306 is read. Therefore, the first buffer 306 and second buffer 308 can operate alternatively, wherein their write/read operations swap over each time.

In this example, a coding procedure may be provided via coding selection inputs 230, 234 to encoder circuit 207 and decoding circuit 209, wherein the coding procedure may be either determined by software or by the circuits themselves.

Figure 4:
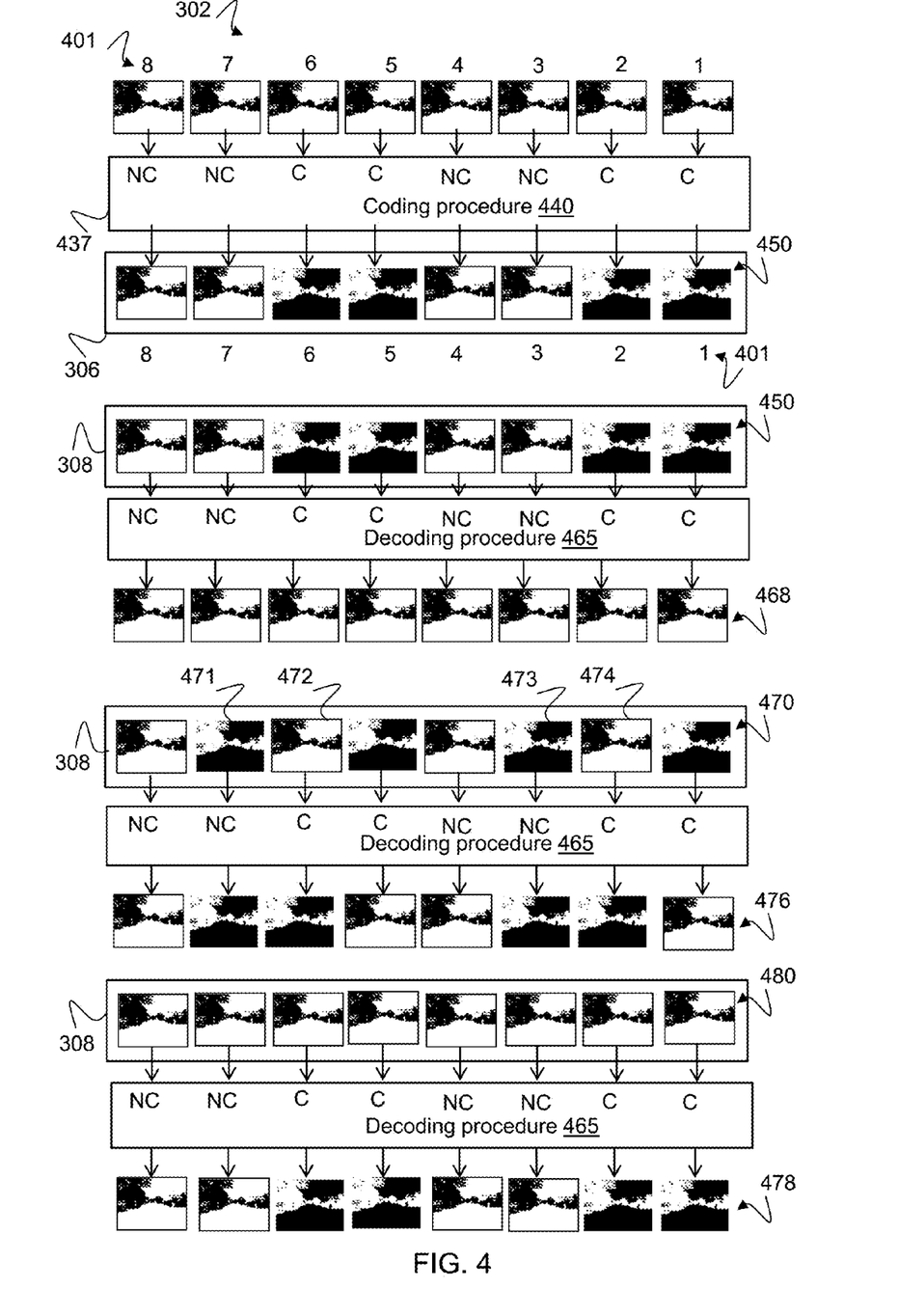
FIG. 4 illustrates an example operation of the expanded encoder/decoder from FIG. 3.

Referring to FIG. 4, an example operation of the expanded encoder/decoder from FIG. 3 is illustrated. An example coding procedure 440 has been illustrated within a further representation 437 of an encoded data frame sequence output from encoder circuit 207, wherein 'NC' refers to a 'not coded' image, and 'C' refers to a 'coded' image.

In this example, a timing reference 401 has been applied to the further representation 437 of the encoded data frame sequence output from encoder circuit 207, in order to illustrate that the series of images form part of a sequence of images. For clarity, the timing reference has not been applied to example decoding procedures 465. However, it should be noted that in these examples, the timing sequence of the images does not change through the coding 440 and decoding 465 procedures.

In this example, a sequence of consecutive images 302, illustrated utilising the timing reference 401, have been input to the representation of encoder circuit 437 via for example one or more of the digital devices (not shown) of FIG. 2. It should be noted that the representation of the encoder circuit 437 has been illustrated as shown in FIG. 4 to clearly show some examples of the invention. For example, the sequence of consecutive images 302 may be received in turn via a single input based on the timing reference 401, and consecutively output in turn via a single output.

The encoding circuit 207 from FIG. 3, may implement the chosen coding procedure 440 by selectively 'coding' or 'not coding' the sequence of received images, which may subsequently be stored in the first buffer 306 or second buffer 308 of image memory 203.

In this example, the encoder circuit 207 may have successfully encoded the sequence of consecutive images according to the coding procedure 440, and stored the encoded images 450 in the first buffer 306 or second buffer 308

If correctly encoded, the (reverse) decoding procedure 465, as performed by decoder circuit 209 when the sequence of correctly encoded images are fetched from the first buffer 306 or second buffer 308, may correctly decode the images, as illustrated in 468, such that they appear in their original form.

Thus, in this example, the decoder circuit 209 from FIG. 2 may utilise a decoding procedure 465 that may match the encoding procedure 440, but which may have a timing offset due, in part, to the time taken to read/write images. This may be because subsequently inverting pixels of an already coded, e.g. inverted, image reverses the original encoding, thereby resulting in the original image.

Therefore, in this example, previously coded images from the encoder circuit 207, which may have had their pixels inverted, would subsequently have their pixels inverted again, resulting in an un-inverted image, by the decoder circuit 209, as long as there had not been any coding issues within the digital imaging system. Therefore, after the encoded images 450 have been processed by the decoder circuit 209, resultant images 468 may be output from the MCU 202 to a display. In this example, the user would be able to view a complete image stream, without any degradation to the displayed images.

In an example that illustrates an error in the encoding and/or decoding process, and referring to 470, the encoded images may no longer be stored in the buffers 306 and 308. Such issues can occur if image data is stored and suddenly writing stops, resulting in old picture content in the buffers 306 and 308. This potentially results in a freeze-frame condition.

As a result, images 471, 472, 473, 474 have been incorrectly processed/transferred by the digital imaging system 200. Therefore, in this example, as the decoder circuit 460 may utilise a coding procedure that matches the coding procedure, and which utilises the same timing reference 401, which may be aligned to the number of stored images in buffers 306 and 308 the output images 476 would be incorrect. In this example, image 471 relates to a coded image 304, whereas it should be 'not coded' (NC). As a result, utilising the decoding procedure 465, image 471 is assumed to be 'not coded' in the decoding process, thereby resulting in no change in the decoding operation and a 'coded' image 304 being output to a display.

Therefore, in this example, the output images 476 comprise a mixture of original images 302 and coded images 304. Therefore, if these concurrent images 476 were displayed to a user, for a length of time to enable the user to recognise a fault/error, which in some examples would be sufficient for the human eye to view an incorrect or flickering image, the user is effectively and visually notified that there is a problem with a part of the digital imaging system 200, even for static or semi-static images relayed via the digital imaging system 200.

In a further example that illustrates an error in the encoding and/or decoding process that would result in a freeze-frame condition, and referring to 480, the encoded images from the first buffer 306 would not have been correctly encoded or transferred to the second buffer 308, or one or more of the buffers 306, 308 would no longer be regularly updated. In this example, two non-coded images are continuously displayed without being updated. A user would not see any image degradation with output images 480 and, therefore, assume that the digital imaging system 200 was working correctly.

However, in accordance with some aspects of the invention, and employing a NC-C coding and decoding scheme, a decoding procedure 465 may be applied by the decoder circuit 209 to the frozen image 480, would resulting in a sequence of coded 304 and, original (not coded) images 302, for example as shown on a 2-frame by 2-frame basis. Therefore, in accordance with some examples of the invention, a user of the digital imaging system 200 would, again, view a flickering image on display 217, due to the decoder 460 outputting this sequence of not coded and coded images 478.

In some examples, any lack of writing or partial writing, lack of reading or partial reading, irrespective of the 'phase' an error appears, will lead to a significant image degradation, which would be noticeable to a user or hardware detection system.

Therefore, utilising some aspects of the invention, a video system has been illustrated that may be operable to output a sequence of consecutive images, which is able to inform a user whether a freeze-frame condition exists within a part of the digital imaging system 200, which may otherwise not be made aware to the user.

It is envisaged that other coding procedures 440 and decoding procedures 465 may be utilised. However, in order for a freeze-frame to be displayed to a user, at least one buffer has to transition from coded to not coded between two write accesses (see FIG. 8). For example, if a coding procedure of NC-C-NC-C-NC-C . . . was utilised for images 470, 480, an image would be displayed without flickering, even though it was a freeze-frame.

In some examples, the encoder circuit 207 and decoder circuit 209 may determine/count on their own which images are to be coded or not coded. Alternatively, in some examples, it may be beneficial to transmit data on the coding/not coding procedure to be utilised via a further communication channel, which must not be the memory channel to protect. Therefore, in some examples, it may be beneficial to transmit/generate coding information using a different path to the sequence of consecutive images.

In some further examples, the decoder circuit 209 may be operable to ascertain the coding/decoding sequence of the encoder circuit 207. Therefore, whenever the decoder circuit 209 is operable to read an image from a buffer, for example the second buffer 308, it may be operable to determine whether that image requires coding or not coding, which may be the inverse of coding in the encoder circuit 207.

In some other examples, it may be necessary to synchronise the coding procedure between the encoder circuit 207 and decoder circuit 209 during a 'power-on' or initialisation state of the digital imaging system 200.

In some other examples, rather than synchronising the encoder circuit 207 and decoder circuit 209, the details of a current coding scheme used by the by the encoder circuit 207 may be transmitted by the encoder circuit 207, utilising a separate communication channel, thereby bypassing the image memory 203.

In some examples, the output from decoder circuit 209 may be received by a display, wherein a user may view the display and determine from a flickering image that there is an issue with the digital imaging system 200.

In some other examples, the output from decoder circuit 209 may be received by further processing circuits, rather than a display that is viewable by a user. In this example, 'flickering' of the image due to coded and non-coded images may allow detection by the further processing circuits, rather than the user and be prone to human error. Such examples may be, for example, traffic signal detection circuits, lane detection circuits, obstacle detection applications (for example one or several software algorithms that detect lanes, traffic signs etc.) and the like. In some examples, the processing unit that executes such a software algorithm may also execute a detection algorithm for the 'flickering'.

Various failures that affect the write channel, for example write channel 232 of FIG. 2, will most likely lead to a frozen image being displayed by display 217. Failures affecting the read channel, for example read channel 236, may not necessarily lead to a frozen image being displayed by display 217. This may be because various failures affecting the read channel 236 may generally display corrupted or black image content that is easily recognisable, as it may generally be different to the real image.

However, in low light conditions, for example in the dark, it may not be easy for either a user or further processing circuit(s) to determine whether there is an issue with the digital imaging system 200. In some examples, the read channel may fail and output black images, which may not be easily recognisable as a fault due to low light conditions. Therefore, utilising a pixel inversion technique to identify frozen images, according to some examples of the invention, may have a further advantage of displaying, via flickering for example, a failure with write channel 232 and/or read channel 236, in low light conditions.

Figure 5:
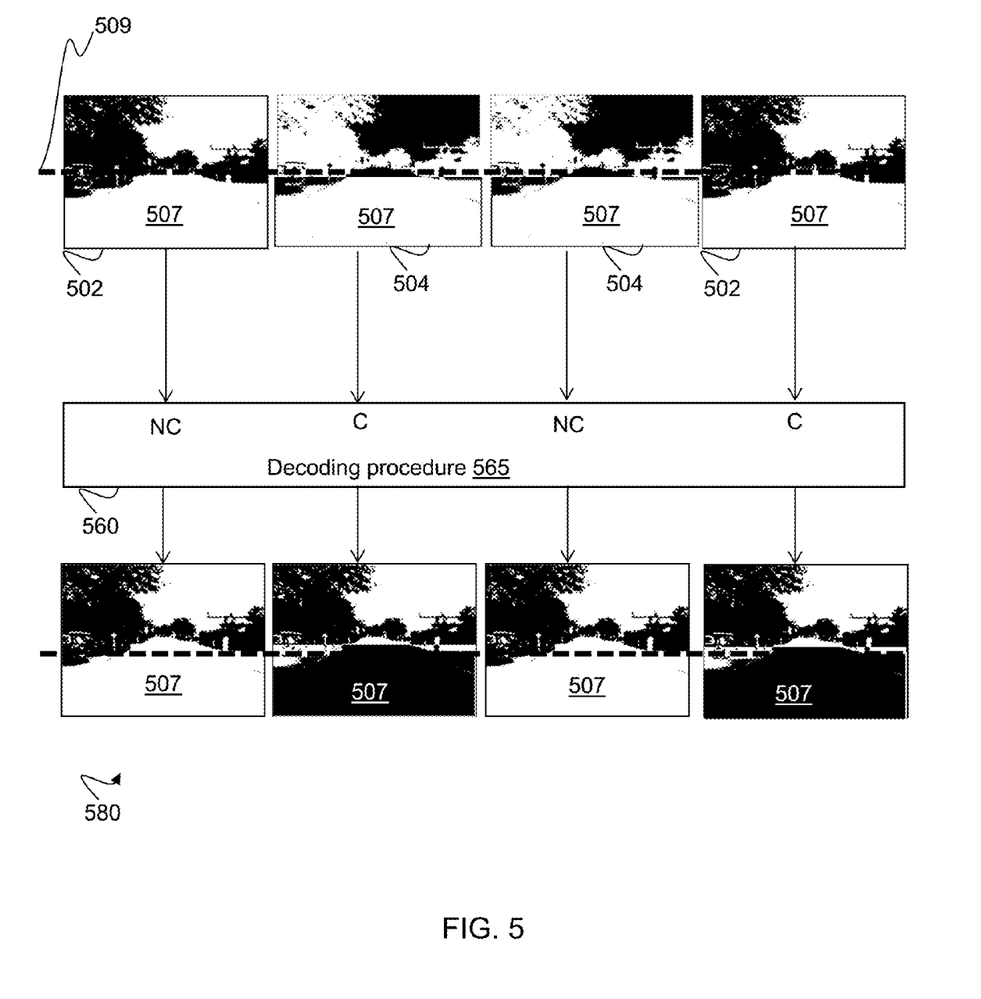
FIG. 5 illustrates a further example operation of the digital imaging system from FIG. 2.

Referring to FIG. 5, a further example operation of the digital imaging system from FIG. 2 is illustrated. In this example, it may be possible for a user or one or more further processing circuits to be operable to detect a partial frozen image. In this example, a series of not coded images 502 and coded images 504 may be received by a decoder circuit 560, wherein for example a lower portion 507, delineated by hashed line 509, of the series of not coded images 502 and coded images 504 may be frozen. This may result in the lower portions 507 of all the not coded images 502 and coded images 504 being the same. This may occur if, for example, there was a failure in addressing logic of a write channel. Further, in some other examples, a 'not coded' image may also comprise a form of second coding, wherein the second coding may not be the same as for the 'coded' images.

Utilising a decoding procedure 565 in this example, where the specifics of the encoding procedure (not illustrated) are not particularly relevant, subsequent decoded images may be output 580. In this example, the lower portions 507 of the series of output images 580 have not been decoded correctly, as they relate to a partial freeze-frame condition. Therefore, in this example, a user may be made aware of the partially frozen lower portion 507, as this partially frozen lower portion 507 may flicker.

It should be noted that FIG. 5 is only one example of many further examples relating to portions of partially frozen images, and therefore should not be seen as limiting.

Furthermore, processing circuits as discussed above may also be operable to detect portions of partially frozen images.

Figure 6:
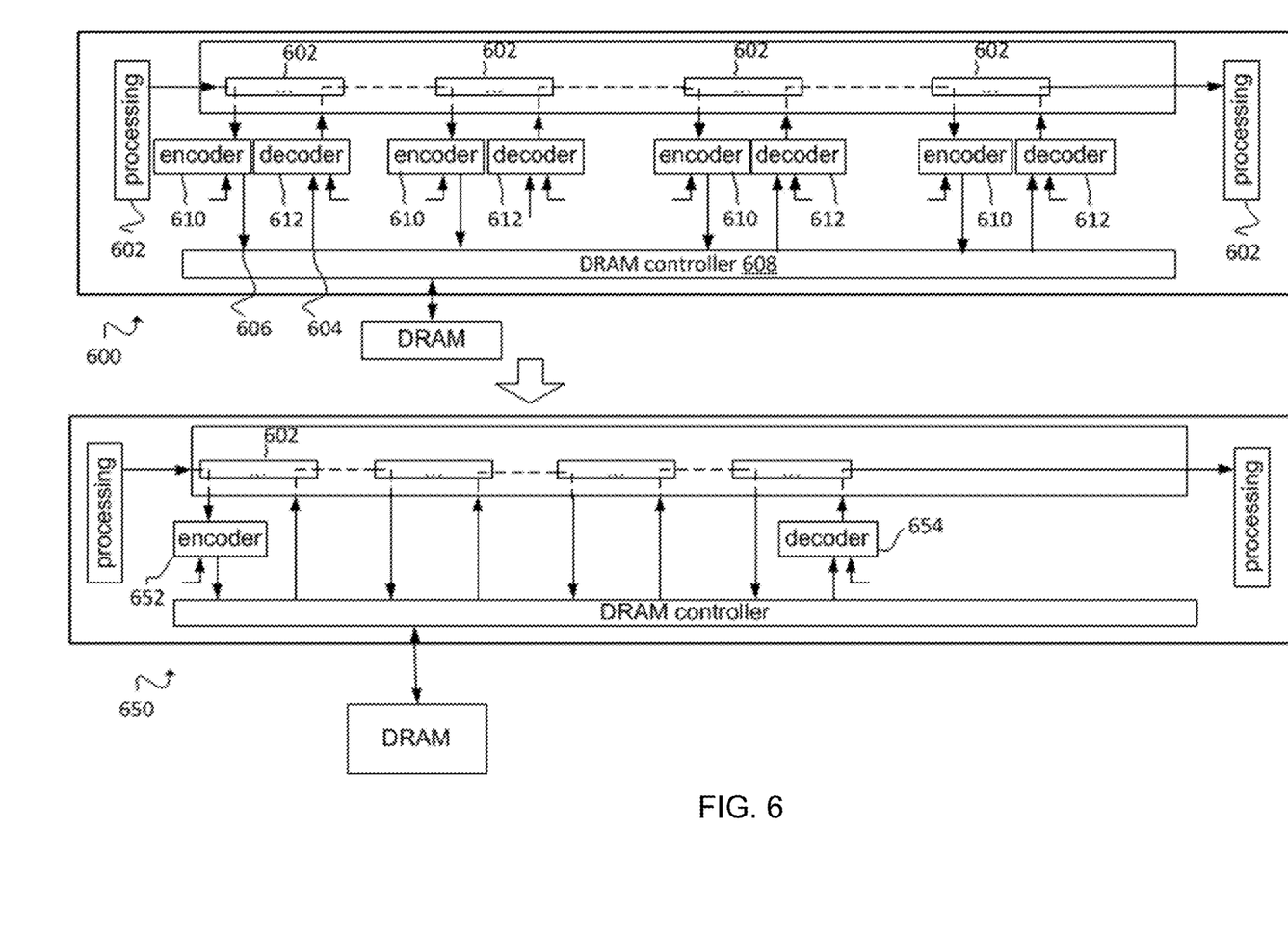
FIG. 6 illustrates an example block diagram of a first and second digital imaging device.

Referring to FIG. 6, a first expanded digital imaging device 600 and second expanded digital imaging device 650 are illustrated, which are based on the digital imaging system from FIG. 2.

In this example, digital imaging device 600 comprises a plurality of processing circuits 602, each of which may require at least read operations 604 and/or write operations 606 between the processing circuits 602 and DRAM controller 608 via encoder circuits 610 and decoder circuits 612.

In some examples, it may be necessary to provide encoding circuits 610 and decoding circuits 612 for all read 604 and write 606 operations. However, in some examples, depending on the coding scheme utilised, and algorithms used, only one encoder circuit 610 and decoder circuit 612 may be required.

For example, referring to digital imaging device 650, which may be utilising a pixel inversion coding procedure, only a first encoder circuit 652 and final decoder circuit 654 may be required. This may be because in some examples of the invention, it may not be the cause of a freeze-frame that is important, but the effect of the freeze-frame on the digital imaging device 650. Therefore, some example aspects of the invention may not seek to identify a particular element that may have caused a freeze-frame, but simply inform a user or further processing circuit that a freeze-frame may have occurred, which can be anywhere within the system between the first encoder circuit 652 and decoder circuit 654. As a result, only the effect of the freeze-frame, e.g., image flickering, is important, rather than what actually caused the effect.

In some examples, if a write path fails, e.g., stops, 'old' image content may remain in the relevant memory buffer, for example first buffer 306. Therefore, all read accesses may be based on this 'old' image. A write path could stop, for example, because the write address may have been modified, for example an image could be written to memory, but to the wrong address.

In some other examples, a write path may stop if there is a disconnection of the write-enable pin of RAM.

Further, in some examples, the write path may stop if there is a failure within a state-machine of the DRAM controller 608.

Referring again to digital imaging device 600, processing circuits 602 may perform a number of tasks, for example scaling received images, enhancing colours of images, changing contents of images, compressing images, making changes to the received images, or changing frame rates from 30 fps to 60 fps, which in this case may provide a series of duplicate frames produced at a sufficient frame rate to directly connect to standard displays. In other examples, interpolating the additional frames may be used instead of duplicating. All of these processing operations may require accessing images from memory. Multiple read and write operations from and to memory can increase the likelihood of freeze-frames. Therefore, in some examples, it may be beneficial to provide the encoding circuit 652 as close to the beginning of the system (or chip) with regard to processing images from camera device(s) as possible, and provide the decoding circuit 654 as close to a display as possible. Therefore, referring to digital imaging device 650, freeze-frames may be detectable within a large number of processing circuits 602, without a need for a dedicated encoder circuit 652 and decoder circuit 654 for each processing circuit 602.

In some examples, the encoding circuit 652 may be implemented within one or more cameras, and the decoding circuit 654 may be implemented within a display or display processor.

It should be noted that throughout this application, references to 'frozen image(s)' relates to one or more images, wherein memory content is not regularly updated.

In some examples, one or more frozen images amongst numerous 'live' images may not necessarily be an issue. For example, a single frozen image within numerous 'live' images in a rear-mirror application, operable to display a rear view of a vehicle, may not necessarily cause a problem.

Utilising a coding scheme, wherein a particular frame is either coded or not coded by an encoding circuit, and subsequently having the inverse, in the case of a pixel inversion application, applied by a decoding circuit, may allow a freeze-frame condition to be highlighted to a user, without 'hidden' information being required, which may degrade the image or may cause additional data to be stored. Further, examples of the invention avoid the known current situation with camera/video systems in that the additional detection logic used to indicate a freeze-frame situation may also become corrupt if a freeze-frame occurred.

Furthermore, image compression techniques, for example JPEG, H264 intra processing, may be utilised with some aspects of the invention. In some examples that may relate to JPEG compression, pixel inversion may show picture degradation if a high compression rate is utilised. Therefore, in some examples, it may be beneficial to utilise colour change in the encoding/decoding of code/no code pixel/frame manipulation process for highly compressed images.

Utilising some aspects of the invention may allow a user or further processing circuits to be made aware of a freeze-frame condition for the whole path from camera output, under certain conditions and if the camera provides an encoding scheme, up to a display driver, if the display driver provides such decoding.

Further, some aspects of the invention may be utilised on specific portions of a system, for example only within a surround-view processor of a system or chip.

Furthermore, some aspects of the invention may provide such error (e.g. freeze-frame) conditions independent of what portion(s) of the system or chip that fails.

Further, some aspects of the invention may be operable to detect partially not updated images/partially frozen images, wherein the displayed image may comprise a mix of correctly and incorrectly decoded images, which may cause a noticeable image flicker.

Figure 7:
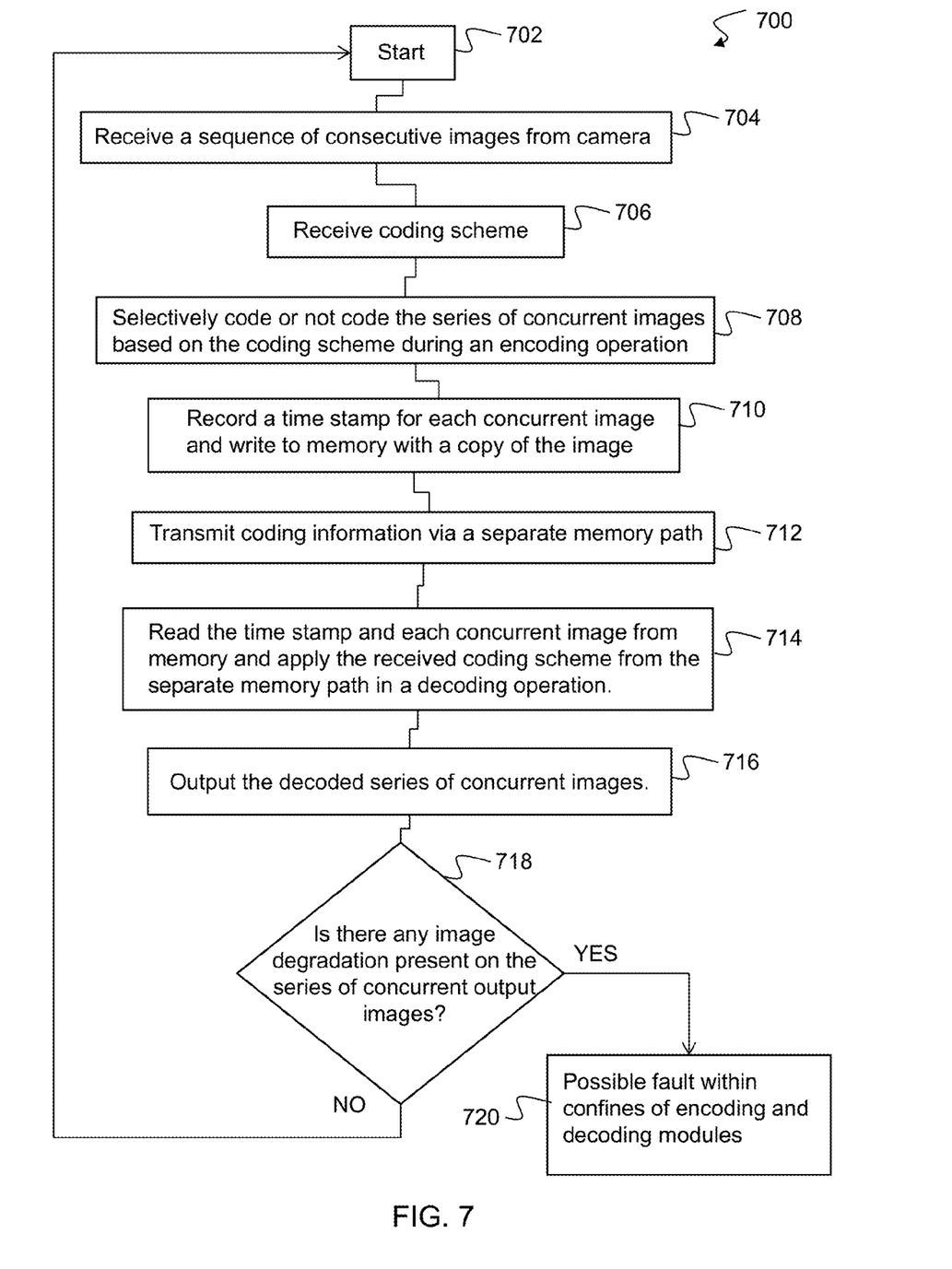
FIG. 7 illustrates an example flow chart of a digital imaging system.

Referring to FIG. 7, a flow chart 700 of an example operation of a digital imaging system is illustrated, whereby the digital imaging system is capable of processing the image frame data in the aforementioned manner, and determine and flagging a possible error determined therefrom. Initially, at 702, the procedure begins and, at 704, the digital imaging system may receive a number (e.g., a sequence) of consecutive images from an image capture device, for example a digital imaging device. At 706, the digital imaging system may receive a coding scheme from software, which may relate to an encoding scheme for the sequence of received consecutive images, if it has not already been informed of the coding scheme to use. In some examples, at 708, the digital imaging system may be operable to selectively code or not code the sequence of consecutive images based on the received coding scheme from 706.

At 710, the digital imaging system may be operable to record a time stamp, wherein a time stamp may relate to a frame number of image number, for each received and encoded image, which may be either coded or not coded, and subsequently write the time stamp and a copy of the sequence of received consecutive images to memory.

At 712, the digital imaging system may transmit the coding information/scheme received at 706 via an additional path to a decoding device. In some examples, the additional memory path may be a secure memory path, which may limit the risk of the coding information being damaged on transit.

Further, in some examples, the recorded time stamps for each received consecutive image may also be transferred via the additional memory path.

At 714, the digital imaging system may read the time stamp for each received consecutive image from memory and apply the received coding scheme in order to decode the sequence of consecutive images.

At 716, the digital imaging system may output the decoded sequence of consecutive images to, for example, a display or further processing circuitry.

At 718, the digital imaging system may determine whether there is any image degradation present on the output sequence of images. If it is determined that there is image degradation, for example flickering of images, the digital imaging system may transition to 720, and report that a fault may be present within the digital imaging system between the confines of the utilised encoder and decoder circuits. Otherwise, if it is determined that there is not a fault, the process may continue and loop to 702 for a new sequence of consecutive images.

In some other examples, as would be appreciated, the determination at 718 may be performed by a user of a display, wherein the user may be operable to determine image degradation by, for example, flickering of images if a freeze-frame has occurred.

Figure 8:
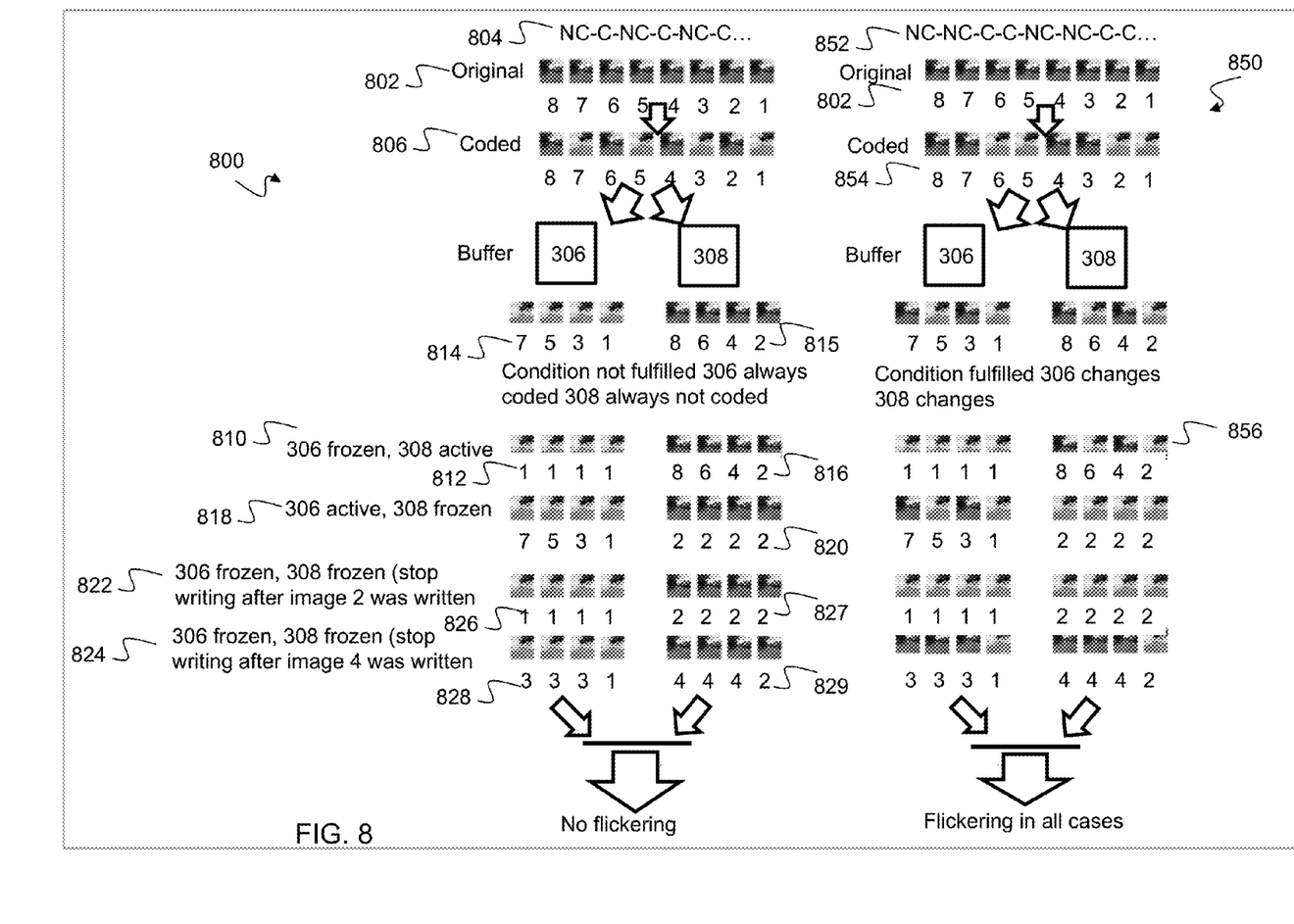
FIG. 8 illustrates an example of an incorrect encoding/decoding procedure and an example of a correct encoding/decoding procedure.

Referring to FIG. 8, diagrams illustrating an example of an incorrect encoding/decoding procedure 800 and an example of a correct encoding/decoding procedure 850 are shown.

Referring first to an example of an incorrect encoding/decoding procedure 800; a series of sequential original images 802 may be selectively and sequentially coded utilising coding scheme 804, resulting in a series of sequentially coded images 806. The series of sequentially coded images 806 may be alternately stored within buffers 306 and 308, such that buffer 306 comprises coded images '7', '5', '3', '1' and buffer 308 comprises coded images '8', '6', '4', '2'.

In order for a flickering image to be displayed and noticeable to a viewer, a sequence of images is transitioned in at least one buffer (e.g., buffer 306 and/or buffer 308), for between two and twenty image write accesses, from a first coded state to a second coded (e.g. not coded) state. In some examples, the lower the number of image write accesses the better, e.g. two, so long as the flickering is noticeable to a human eye. Therefore, coding scheme 804 does not satisfy this condition. For example, buffer 306 comprises a series of coded images 814, and buffer 308 comprises a series of not coded images 815.

Referring to an example 810, the first buffer 306 may have malfunctioned, leading to frozen images '1' being output from buffer 306. During a decoding procedure, since the frozen buffer 306 still comprises a series of coded images 812, in this example a series of '1' images, which do not match the originally to be stored images 814, they will, however, still result in a decoded image without any flickering. This is because in this example, the buffer 308 only comprises not coded images 816. Therefore, although the decoded image will not match in terms of sequential images, there will be no flickering present, and therefore a user or hardware processor may not determine that a freeze-frame condition has occurred.

Referring to another example 818, the second buffer 308 may have malfunctioned leading, to frozen images '2' 820 being output from buffer 308. In this example, although frozen images '2' 820 do not correspond with previously coded images 815, a decoded image will be output without any flickering present, and therefore, a user or hardware processor may not determine that a freeze-frame condition has occurred.

Similarly, in examples 822, 824 wherein both buffers 306, 308 may have malfunctioned, leading to a series of frozen images 826, 827, 828, 829, although the frozen images do not correspond with previously coded images 815 or not coded images 812, a decoded image will be output without any flickering present.

Referring secondly to an example of a correct encoding/decoding procedure 850; a series of sequential original images 802 may be selectively and sequentially coded utilising coding scheme 852, resulting in a series of sequentially coded images 854. The series of sequentially coded images 854 may be alternately stored within buffers 306 and 308, such that buffer 306 comprises alternately coded/not coded images 7, 5, 3, 1, and buffer 308 comprises alternately coded/not coded images 8, 6, 4, 2.

In this example, the coding scheme 852 does comprise at least one buffer transition from coded to not coded between two write accesses. Therefore, in this example, buffers 306, 308 comprise a series of coded and not coded images.

Referring again to 810, in the example of 850, as buffer 308 comprises a number of coded and not coded images 856, the decoded image will result in a flickering image, even if buffer 306 is frozen. This is because in the example of 850, each buffer 306, 308 comprises both coded and not coded images, resulting in an incorrectly decoded image, showing image flicker, if any one or both of buffers 306, 308 output frozen images.

Therefore, in some examples where buffers 306 and 308 alternately store coded images 806, 854, it may be beneficial to provide a coding scheme 852, wherein at least one buffer 306, 308 transitions from a coded state to a not coded state between two write accesses.

In some examples, some aspects of the invention may be entirely implemented in software.

Those skilled in the art will recognize that the boundaries between logic or functional blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for detecting a freeze-frame condition, the method comprising:
   receiving a first sequence of images from a digital device, the first sequence of images representative of information to be displayed, the first sequence including a first image;
   encoding each image of a first subset of the first sequence of images, images of the first subset of images residing at first positions of the first sequence of images relative to the first image, wherein the encoding uses a first coding scheme that causes an adjustment to an image characteristic of the image being encoded;
   identifying a second subset of the first sequence of images, the second subset comprising only a remaining set of images of the first sequence of images that are not included in the first encoded subset, images of the second subset of images residing at second positions of the first sequence of images relative to the first image;
   storing at a memory a second sequence of images comprising the first encoded subset of the first sequence of images and the second subset of the first sequence of images;
   retrieving from the memory a third sequence of images, the third sequence of images corresponding to the second sequence of images;
   identifying, based on the first positions of the first sequence of images, a first subset of images of the third sequence of images;
   identifying, based on the first positions of the first sequence of images, a second subset of images of the third sequence of images;
   decoding each image of the first subset of images of the third sequence of images using the first coding scheme to provide decoded images; and
   generating a fourth sequence of images, the fourth sequence of images based on the decoded images and based on the second subset of images of the third sequence of images.

2. The method of claim 1 wherein encoding comprises at least one from a group consisting of:
   using the first coding scheme to select individual images of the first sequence of images to encode;
   encoding prior to or during a write operation to a memory that stores the encoded images and decoding after or during a read operation at the memory; and
   encoding a portion of an image from a plurality of the images of the first sequence of images.

3. The method of claim 1 wherein the first coding scheme is known apriori by an encoder performing the encoding and a decoder performing the decoding.

4. The method of claim 1 further comprising displaying the fourth sequence of images.

5. The method of claim 1 further comprising detecting a freeze-frame condition based on the image characteristic of successive images of the fourth sequence of images.

6. The method of claim 1 wherein the first coding scheme causing an adjustment to an image characteristic of the encoded images or the portion of the image being encoded comprises inverting of a range or all pixel values of an image.

7. The method of claim 6 wherein inverting of a range or all pixel values of an image comprises adjusting at least one of: white pixels to black pixels, black pixels to white pixels, modifying a colour of pixels, exchanging Cb with Cr, inverting Cb and inverting Cr.

8. The method of claim 6 wherein the first coding scheme causing an adjustment to an image characteristic of the encoded images or the portion of the image being encoded comprises introducing a timing aspect to the encoding and the decoding.

9. The method of claim 8 wherein introducing the timing aspect comprises at least one from a group consisting of:
aligning a number of stored images in image memory such that respective encoding and decoding is performed on the same image data;
varying address locations of blocks of image data; and
varying the address locations of blocks of image data utilising a different address of a buffer start for each image, or utilising more bits to store and change bit positions.

10. The method of claim 1 wherein a fault during the storing or the retrieving causes an encoded image not to be decoded or an image that was not encoded to be decoded, causing the fourth sequence of images to include image characteristics not present in the first sequence of images to facilitate detecting the existence of a freeze-frame condition.

11. The method of claim 10 wherein the encoding further comprises encoding between two and twenty successive images.

12. The method of claim 1 further comprising transmitting coding scheme data from an encoder performing the encoding to a decoder performing the decoding via a communication channel that is not used to transmit image data.

13. The method of claim 1 wherein detecting a freeze-frame condition comprises detecting multiple freeze-frames within a static or semi-static image.

14. A video system for detecting a freeze-frame condition, the video system comprising:
at least one input port for receiving a first sequence of images from at least one digital device, the first sequence of images representative of information to be displayed, the first sequence including a first image;
a processor to identify images of a first subset of images of the first sequence of images residing at first positions of the first sequence of images relative to the first image, and to identify a second subset of the first sequence of images comprising only a remaining set of images of the first sequence of images that are not included in the first encoded subset, images of the second subset of images residing at second positions of the first sequence of images relative to the first image;
an encoder arranged to encode each image of the first subset of images using a first coding scheme that causes an adjustment to an image characteristic of the images being encoded;
a memory arranged to store a second sequence of images comprising the first encoded subset of the first sequence of images and the second subset of the first sequence of images;
the processor further to:
retrieve from the memory a third sequence of images, the third sequence of images corresponding to the second sequence of images;
identify, based on the first positions of the first sequence of images, a first subset of images of the third sequence of images; and
identify, based on the first positions of the first sequence of images, a second subset of images of the third sequence of images:
a decoder arranged to decode each image of the first subset of images of the third sequence of images using the first coding scheme to provide decoded images; and
an output port for outputting a fourth sequence of images, the fourth sequence of images based on the decoded images and based on the second subset of images of the third sequence of images.

15. The video system of claim 14 further comprising a display operably coupled to the output port and arranged to display the fourth sequence of images.

16. The video system of claim 14 wherein the processor is further to process the fourth sequence of images and automatically determine that a freeze-frame condition exists based on a comparison of the image characteristic between successive images of the fourth sequence of images.

17. The method of claim 1 wherein the first subset of the first sequence of images is selected based on timing of write accesses at an image buffer.

18. The video system of claim 14 wherein the first subset of the first sequence of images is selected based on timing of write accesses at an image buffer.

* * * * *